Dec. 6, 1960  E. J. WEISSE ET AL  2,962,899
BALANCING MACHINE WITH ELECTRO-MECHANICAL DYNAMOMETERS
Filed April 16, 1956
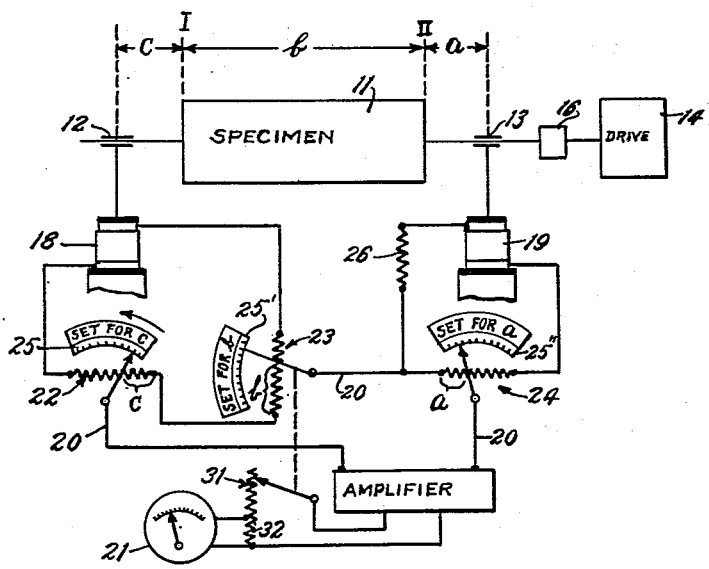
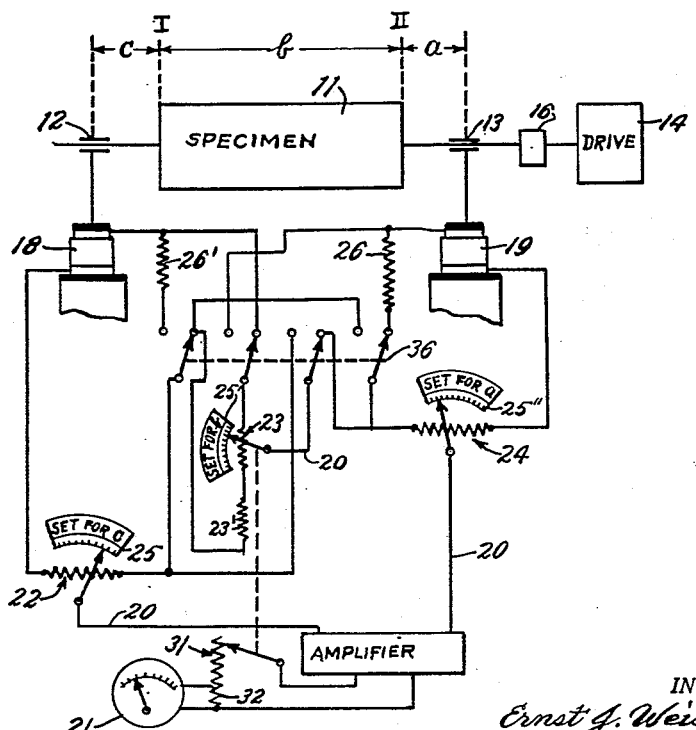
INVENTORS.
Ernst J. Weisse &
Karl Hilgers
By:- Howard H. Darbo ATTY.

United States Patent Office

2,962,899
Patented Dec. 6, 1960

2,962,899

BALANCING MACHINE WITH ELECTRO-MECHANICAL DYNAMOMETERS

Ernst Jurgen Weisse and Karl Hilgers, Dusseldorf, Germany, assignors to Losenhausenwerk, Dusseldorfer Maschinenbau, A.G., Dusseldorf-Grafenberg, Germany Filed Apr. 16, 1956, Ser. No. 578,469

Claims priority, application Germany Apr. 25, 1955

7 Claims. (Cl. 73—462)

A large variety of balancing apparatus has been provided in the past for aiding in dynamically balancing a rotating part. The principles involved, although complex, are well known. Amazing simplicity has already been achieved for balancing a succession of like units, for which the bearing planes and the balancing planes can remain constantly located. When unlike units are to be successively balanced, such simplicity is not so easily attained. According to the present invention, this simplicity is nevertheless achieved. After once calibrating the apparatus, it is merely necessary to set three control members to point to the figures on adjacent scales representing the distances between the planes. The distances for which the three control members are to be set are easily determined on a new type of specimen by measurement. The indicator will then indicate the exact amount of unbalance, first in one of the balancing planes and, after flipping a switch unit, in the other of the balancing planes.

Additional objects and advantages of the invention will be apparent from the following description and from the drawings.

*Designation of figures*

Fig. 1 is a diagrammatic representation of one form of the invention, simplified by the omission of the switching system. As illustrated, it will indicate the unbalance for only one of the two planes.

Fig. 2 is a diagrammatic representation of the same apparatus with the switching facilities added, so that, after determining the unbalance for one balancing plane, the switch unit can be flipped and the unbalance for the other balancing plane immediately shows on the indicator.

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

*Known underlying theory*

In Fig. 1, a specimen 11 has been shown rotatably mounted in a substantially non-oscillating manner by bearings 12 and 13 and driven in any conventional manner, represented by a drive unit 14 and a coupling device 16, designed to avoid the transmission to the specimen of vibrational forces. The bearings 12 and 13 are substantially non-oscillating so that detectors applied to them and actuated by negligible amplitudes of movement will measure unbalanced forces rather than the amplitude of movement of a widely oscillating system.

The detectors physically connected to the bearings 12 and 13 are preferably piezoelectric crystal units 18 and 19, against which the bearings rest. These generate voltages proportional to the compressive forces applied to them between the bearing and firm backing. They may be more broadly referred to as transmitters or voltage producers or electro-mechanical dynamometers. It is apparent that the voltage produced by the piezoelectric crystal 18 can be used to indicate the unbalance force applied to the bearing 12 and the voltage produced by the crystal 19 can be used to indicate the unbalanced force applied to the bearing 13, as the specimen is rotated.

It is not usually practical to make balancing corrections in the planes of the bearings. Accordingly, other balancing planes must be chosen which, from the nature of the specimen, lend themselves to correction, as by adding counterweights, or removing unnecessary metal. In the drawings, the balancing planes are assumed to be at the opposite ends of the main body of the specimen, and are designated I and II.

It has been recognized that the transmitters 18 and 19 could be used by proper calculations to indicate the unbalance first with respect to plane I and second with respect to plane II. It has also been recognized that, after proper calibration for a given type of specimen, voltage dividers connected to the two transmitters could give a reading on an indicator showing the unbalance first for one of the planes and then the other.

Although Fig. 1 embodies the present invention, the underlying theory can be explained with respect to it. It shows connections suitable for determining the unbalance with respect to balancing plane I.

For the purpose of explanation, and for the purpose of initially calibrating the apparatus, it is helpful to assume that a specimen previously perfectly balanced is unbalanced by applying unbalancing weights in the two planes I and II. Let us first assume that we unbalance the specimen by attaching a small unknown weight in plane II. It is necessary that the system be one which will ignore this unbalance, because it can be corrected entirely in plane II, and the connections shown in Fig. 1 are for determining the unbalance correctable in plane I. The unknown weight in plane II will exert most of its unbalance force on bearing 13, to which it is closer. It will exert some on bearing 12. These forces will be inversely proportional to the distances of plane II from the two bearing planes. In other words, the force at 13 multiplied by the distance $a$ will equal the force on bearing 12 multiplied by the distance $b$ plus $c$. Hence, if voltage dividers such as potentiometers are put in the two circuits and properly adjusted and the outputs connected in opposition, the outputs will exactly balance, and indicator 21 will read "Zero." This much has been known. Now let us apply this theory to Fig. 1.

*The Fig. 1 circuit*

In Fig. 1, transmitters 18 and 19 have been connected to equalized circuits, so that a given actuation of transmitter 18 would cause the same value of current to flow through potentiometers 22 and 23 as the same actuation of transmitter 19 would cause to flow through potentiometer 24. All 3 potentiometers are uniform. The tap on potentiometer 22 is spaced from the right-hand end a distance corresponding to the distance $c$. The tap on potentiometer 23 is spaced up from its bottom a distance corresponding to distance $b$. The tap on potentiometer 24 is spaced from the left a distance corresponding to distance $a$. These settings may be made by associated scales 25, 25' and 25". Now the connections to output circuit 20 cause the voltage output from resistance portion $c$ to be added to that from resistance portion $b$, thereby in effect multiplying the current from transmitter 18 by the factor $b$ plus $c$. The current produced by transmitter 19 is only multiplied by the factor $a$. This latter voltage is connected in opposition to the voltage output across $b$ plus $c$. Hence we have in effect subtracted the force on bearing 13, multiplied by $a$, from the force on bearing 12 multiplied by $b$ plus $c$. If we assume a balanced specimen except for the weight we added in plane II, these products or output voltages are equal, and the differential output voltage is zero, so that indicator 21 reads "Zero."

Now, if we add another weight to the specimen, this time in plane I, this weight will not produce equal output voltages and accordingly the same indicator 21 will move away from the zero position and given an indication which can be interpreted to determine the amount of unbalance. If this last added weight was chosen as a known weight of one ounce, and if we calibrate the scale of indicator 21 to place a "1" where the needle comes to rest, we will have calibrated that portion of the apparatus so far explained for the speed of drive unit 14 used. In actual practice, translator or indicator 21 will be connected through an amplifier as shown and by adjusting its gain or by a suitable adjustment in the output circuit, the system could be calibrated by the turn of a knob.

*Compensation for separation of planes of balance*

Prior to the present invention, results similar to those so far described have been achieved by using a single potentiometer in place of potentiometers 22 and 23. According to the present invention, the use of these two potentiometers permits setting one for distance $c$ and setting the other for distance $b$. The full advantages of this will be apparent only when we come to describe Fig. 2. Some of the advantage can be explained with reference to Fig. 1, however. If we assume that a different type of specimen is applied to the apparatus with different distances for $a$, $b$ and $c$, the potentiometers 22, 23 and 24 should be reset by their scales 25, 25' and 25" according to these new dimensions. If to a perfectly balanced specimen a weight is added in the newly-located plane II, the new settings of the potentiometers will cause this weight to be disregarded and indicator 21 will read "Zero" as before. However, if a one-ounce weight is applied in plane I, and if we ignore the potentiometer 31 which has not yet been described, the indicator 21 would no longer indicate one ounce. The purpose of the potentiometer or rheostat 31 is to compensate for changes in the dimension $b$.

The need for this compensation can perhaps be understood better if it is recognized that, as planes I and II are moved closer together a larger and larger proportion of the weight in plane I exerts its force on bearing 13, where it produces a subtracting voltage, which makes the total or differential output voltage delivered in circuit 20 to the amplifier smaller and smaller.

As the tap for rheostat 31 is moved downward, however, the output current of the amplifier, assuming a given input, increases. This therefore makes the indicator 21 read higher. The tap of rheostat 31 can be physically linked to the tap on potentiometer 23, so that they move equally, and the adjustment of rheostat 31 compensates for the change in the length $b$ on account of which the setting of potentiometer 23 had to be changed. By proper choice of rheostat 31 in relation to other factors, the compensation can be exact.

If the amplifier is one which, for a suitable range of output current, will maintain a constant output voltage for a constant input voltage, the rheostat 31 will have a very simple relationship to the potentiometer 23. If we refer for a moment to Fig. 2, we will see that the resistance which, in Fig. 1 is shown as one resistance, is in Fig. 2 shown as two resistances, the resistance 23' being shown in series with the potentiometer 23. If now the rheostat 31 and potentiometer 23 are identical, and if resistance 32 is equal to resistance to 23', proper compensation will be provided with the amplifier characteristics assumed.

*The Fig. 2 circuit*

Fig. 2 illustrates the same circuits shown in Fig. 1, but with switching facilities added for easily revising this circuit to indicate the unbalance in plane II instead of plane I.

As illustrated in Fig. 2, the connections are such that the circuits are the same as in Fig. 1. Thus, the switching facilities 36 are positioned for indicating the unbalance with respect to plane I. If the circuits are traced, it will be seen that the potentiometer 23 (including its fixed resistor portion 23') is in series with potentiometer 22, both powered by transmitter 18. Likewise, potentiometer 24 is in series with balancing resistance 26, both across transmitter 19.

After a reading on indicator 21 is taken with respect to plane I, switch unit 36 is manually thrown to the left for taking a reading with respect to plane II. It will now be apparent that potentiometer 23 with its supplemental resistance 23' will be in series with the resistance of potentiometer 24, both energized by transmitter 19, resistance 26 no longer being in the circuit. The two transmitter circuits will be kept equalized, nevertheless, because equalizer resistance 26' will have been inserted in the circuit in series with potentiometer resistance 22 across transmitter 18. The lead from the tap on potentiometer 23 will also have been shifted. Now the output voltage of potentiometer 23 (including its fixed resistance portion 23') will be added to the output voltage of potentiometer 24, and these two will be connected in opposition to the output voltage of potentiometer 22. The total or differential output voltage will again be applied as the input voltage to the amplifiers, and the output will produce a reading on indicator 21.

From the foregoing, it can be understood that, when the apparatus is to be used for a new type of specimen, it is only necessary to measure the distances $a$, $b$ and $c$ of the specimen and set the potentiometers 24, 23 and 22, by their scales 25, 25' and 25" to correspond to these distances. With the switch 36 positioned as shown in Fig. 2, the indicator 21 will now give a reading stating directly the unbalance with respect to plane I. Upon flipping the switch unit 36, the indicator 21 will give a reading indicating directly the unbalance with respect to plane II. Of course many variations are possible, while still utilizing the concepts of this invention. Some variations, however, will not make full use of these concepts. For example, resistor 31 could have a separate scale instead of being physically coupled to potentiometer 23. The proper setting of resistor 31 by its own assumed scale would here give compensation for the distance $b$, even if the two opposed voltage divider systems to which it was jointly responsive were different than as illustrated.

The use of the three potentiometers and a switch unit 36 is useful without the compensating feature represented by rheostat 31. By setting the three potentiometers as indicated, readings can be taken for both balancing planes merely by flipping the switch unit 36. With calculation for the particular length $b$, or with initial calibration for it, correct results will be obtained.

*Further details*

Resistances 26 and 26' should be equal, and should each equal the total resistance of potentiometer 23 together with its fixed resistor 23'. The relationship between the potentiometers 22, 23 and 24 may depend somewhat on the assortment of specimens expected to be tested. For economy of production, there is some advantage in having three identical potentiometers, and having scales for potentiometers 22 and 24 identical. The scale for potentiometer 23 would have at its left-hand end a figure naming a distance deemed the minimum tolerable spacing for balancing planes I and II.

The fixed resistance 23' would then have a resistance corresponding to this minimum tolerable spacing. In case any specimen submitted for test had any of its dimensions *a*, *b* or *c* too great for the corresponding scale 25, 25' or 25" all three potentiometers could be set for half of the dimensions *a*, *b* and *c*, respectively. The reading on indicator 21 will nevertheless be correct, because although the differential voltage is halved, its relative effect is doubled by rheostat 31.

If there is no expectation of having specimens in which the dimension *b* is larger than any of the dimensions *a* and *c* for this or other specimens, the potentiometer 23 in Fig. 2 can have a lower resistance value along its adjustable range and its scale correspondingly can have wider spacing for more accurate adjustment.

The important consideration is that the resistance 23' plus the portion of the resistance 23 to the tap for any scale setting of its associated scale 25' will be equal to the resistance to the tap in potentiometers 22 and 24, if set for the same figure on their respective scales. In other words, the resistances included in the output circuits should be proportional to the scale readings, with equality for like readings on the three scales.

The indicator 21 may be an indicating watt meter connected according to known principles. Although the amplifier may be a single stage amplifier, a two-stage amplifier is more likely to be used. In that case the compensating rheostat 31 need not be in the final output. Of course the indicator 21 would still be powered by the final amplifier output.

The scales 25, 25' and 25" preferably bear designations of the units of length for which the apparatus is calibrated.

We claim:

1. Balancing apparatus including bearing means restrained against oscillation in two spaced bearing planes, an electro-mechanical voltage transmitter responsive to the restraining force required by each bearing means, first and second voltage dividers connected to be energized in proportion to the output of a first of the transmitters, and a third voltage divider connected to be energized in proportion to the output of the second transmitter, components of the voltages produced by the transmitters being taken off at the voltage dividers and connected in opposition to provide a differential voltage, characterized in that the proportions of the output voltages of the first and second voltage dividers to the first transmitter voltage and of the third voltage divider to the second transmitter voltage are respectively proportioned to the distance of the bearing plane of the first transmitter from the nearest of two chosen balancing planes, the distance between the two chosen balancing planes and the distance of the bearing plane of the second transmitter from the balancing plane nearest it; and having in combination therewith an indicator and means to actuate the indicator in proportion to the differential voltage, this last named means being adjustable to vary this proportion, and the second voltage divider being coupled to be jointly adjustable therewith.

2. Balancing apparatus according to claim 1, in which the voltage dividers are adjustable and are provided with scales to indicate their adjustment, each scale being marked in proportion to the ratio of voltage takeoff when the associated divider is adjusted by it, the three voltage dividers, throughout their ranges of adjustment indicated by the scales, having the same relationship to one another as to their respective ratios of voltage takeoff as do their scale readings.

3. Balancing apparatus according to claim 1, in which the voltage dividers are adjustable and are provided with scales to indicate their adjustment, each scale being marked in proportion to the ratio of voltage takeoff when the associated divider is adjusted by it, the three voltage dividers, throughout their ranges of adjustment indicated by the scales, having the same relationship to one another as to their respective ratios of voltage takeoff as do their scale readings, and in which the proportional adjustment effect of the second voltage divider on its output voltage is equal and opposite to the proportional adjustment effect of the indicator-actuating means.

4. Balancing apparatus including bearing means restrained against oscillation in two spaced bearing planes, an electro-mechanical voltage transmitter responsive to the restraining force required by each bearing means, first and second voltage dividers connected to be energized in proportion to the output of a first of the transmitters, and a third voltage divider connected to be energized in proportion to the output of the second transmitter, components of the voltages produced by the transmitters being taken off at the voltage dividers and connected in opposition to provide a differential voltage, characterized in that the proportions of the output voltages of the first and second voltage dividers to the first transmitter voltage and of the third voltage divider to the second transmitter voltage are respectively proportioned to the distance of the bearing plane of the first transmitter from the nearest of two chosen balancing planes, the distance between the two chosen balancing planes and the distance of the bearing plane of the second transmitter from the balancing plane nearest it; and by having in combination therewith an indicator and means to actuate the indicator in proportion to the differential voltage, this last named means being adjustable to vary this proportion, and a scale for indicating this adjustment, said scale being calibrated to show higher readings as this proportion is decreased and to indicate the distance between the balancing planes with a scale spacing so related to the adjustability of this means that as the adjustment is varied, the indicator reading will vary inversely as the scale reading varies.

5. Balancing apparatus including bearing means restrained against oscillation in two spaced bearing planes, an electro-mechanical voltage transmitter responsive to the restraining force required by each bearing means, first and second voltage dividers connected to be energized in proportion to the output of a first of the transmitters, and a third voltage divider connected to be energized in proportion to the output of the second transmitter, components of the voltages produced by the transmitters being taken off at the voltage dividers and connected in opposition to provide a differential voltage, characterized in that the proportions of the output voltages of the first and second voltage dividers to the first transmitter voltage and of the third voltage divider to the second transmitter voltage are respectively proportioned to the distance of the bearing plane of the first transmitter from the nearest of two chosen balancing planes, the distance between the two chosen balancing planes and the distance of the bearing plane of the second transmitter from the balancing plane nearest it, a switching system for removing the second voltage divider from its stated relationship and instead connecting it to be energized by the other transmitter and to add its output voltage to the output voltage of the third voltage divider, and compensaing means switched by the switching system to keep the same relationship of the outputs of the first and third voltage dividers to the associated transmitters.

6. Balancing apparatus including bearing means restrained against oscillation in two spaced bearing planes, an electro-mechanical voltage transmitter responsive to the restraining force required by each bearing means, first and second voltage dividers connected to be energized in proportion to the output of a first of the transmitters, and a third voltage divider connected to be energized in proportion to the output of the second transmitter, components of the voltages produced by the transmitters being taken off at the voltage dividers and connected in opposition to provide a differential voltage, characterized in that the proportions of the output voltages of the first and second voltage dividers to the first transmitter voltage and of the third voltage divider to the second transmitter voltage are respectively proportioned to the distance of the bearing plane of the first transmitter from the nearest of two chosen balancing planes, the distance between the two chosen balancing planes and the distance of the bearing plane of the second transmitter from the balancing plane nearest it, a switching system for removing the second voltage divider from its stated relationship and instead connecting it to be energized by the other transmitter and to add its output voltage to the output voltage of the third voltage divider, and compensating means switched by the switching system to keep the same relationship of the outputs of the first and third voltage dividers to the associated transmitters; said compensating means including a compensating resistance equal to the resistance of the second voltage divider and switched by the switching system into the circuit from which the second voltage divider is removed, said switching means including means for completing the circuit including the second voltage divider independently of such compensating resistance.

7. Balancing apparatus including bearing means restrained against oscillation and effectively positioned in two spaced bearing planes, an electro-mechanical voltage transmitter responsive to the restraining force required by each bearing means, first and second voltage divider systems adapted for independent manual setting, scale means associated with each voltage divider system with the scales and the voltage dividers so correlated that the ratio of voltage takeoff of each voltage divider system may be varied in proportion to the distance between the bearing plane of the bearing means to which it is responsive and a first of two balancing planes by setting the voltage divider so that its scale indication corresponds to said distance, the ratios of voltage takeoff of the two systems, through the range of adjustment indicated by their scale means, having the same relationship to each other as the relationship indicated by their scale means, a circuit for connecting the take-offs of the two voltage divider systems in opposition to provide a differential voltage, a translator, means to actuate the translator in proportion to the differential voltage, and adjustable means for varying the proportion, said adjustable means being so correlated to a scale that when set to provide scale indications corresponding to different distances between the two balancing planes the adjustable means will vary this proportion inversely in proportion to the distance between the balancing planes.

References Cited in the file of this patent

UNITED STATES PATENTS

| | | |
|---|---|---|
| 2,289,074 | Rushing et al. | July 7, 1942 |
| 2,315,578 | Baker | Apr. 6, 1943 |
| 2,322,561 | Bevins et al. | June 22, 1943 |
| 2,331,733 | Senger | Oct. 12, 1943 |
| 2,451,863 | Oakley | Oct. 19, 1948 |
| 2,730,899 | Hellar et al. | Jan. 17, 1956 |
| 2,731,834 | Fehr et al. | Jan. 24, 1956 |
| 2,815,666 | Pischel | Dec. 10, 1957 |